Sept. 18, 1951 J. A. J. BENNETT 2,568,214
ROTARY WING AIRCRAFT STRUCTURE AND INTERCONNECTED DAMPING DEVICE
Filed Aug. 5, 1946 2 Sheets-Sheet 1

INVENTOR
JAMES ALLAN JAMIESON BENNETT,
BY Robert B Larson
ATTORNEY

Sept. 18, 1951  J. A. J. BENNETT  2,568,214
ROTARY WING AIRCRAFT STRUCTURE AND INTERCONNECTED DAMPING DEVICE
Filed Aug. 5, 1946  2 Sheets-Sheet 2

INVENTOR
JAMES ALLAN JAMIESON BENNETT,
BY
ATTORNEY

Patented Sept. 18, 1951

2,568,214

UNITED STATES PATENT OFFICE 2,568,214

ROTARY WING AIRCRAFT STRUCTURE AND INTERCONNECTED DAMPING DEVICE

James Allan Jamieson Bennett, Round Riding Road, Scotland

Application August 5, 1946, Serial No. 688,450
In Great Britain September 21, 1945

12 Claims. (Cl. 170—160.55)

The present invention relates to rotary wing aircraft having one or more rotors for sustentation, said rotors being either power-driven or autorotative in flight, and having each rotor blade mounted on a flapping pivot, which allows the zenith angle of the blade to be varied, and on a drag pivot, which allows the blade to be displaced angularly in azimuth with respect to the rotor head (i. e. the member to which the blades are attached). An object of the invention is to provide an improved arrangement for damping the oscillation of each blade about its drag pivot.

Hitherto blade dampers have been provided with the same amount of damping in flight as when the rotor is being started or stopped with the aircraft on the ground. As a result, the damping which is necessary to prevent the occurrence of self-excited oscillations (sometimes referred to as "ground resonance") during starting or stopping of the rotor, has been a source of rotor vibration in flight and has caused a fluctuating bending moment in the plane of rotation of such amplitude that, occasionally, the blade has failed by fatigue.

In a rotary wing aircraft according to the invention, having articulated blades, the drag hinge dampers are provided with means for adjusting the damping of the blade oscillations so that the damping is sufficient for preventing self-excited oscillations during starting or stopping of the rotor but is reduced in flight to give smoother operation of the rotor and to limit the amplitude of the periodic bending moment in the plane of rotation. The dampers may be controlled manually by the pilot, but, preferably, are controlled automatically, for example by a centrifugal governor or by the displacement of the blade about an articulation, so that, below a predetermined angular speed of the rotor, the damping is sufficient to prevent self-excited oscillations and, at a greater speed, the damping is reduced for operation in flight.

Figures 1, 2:
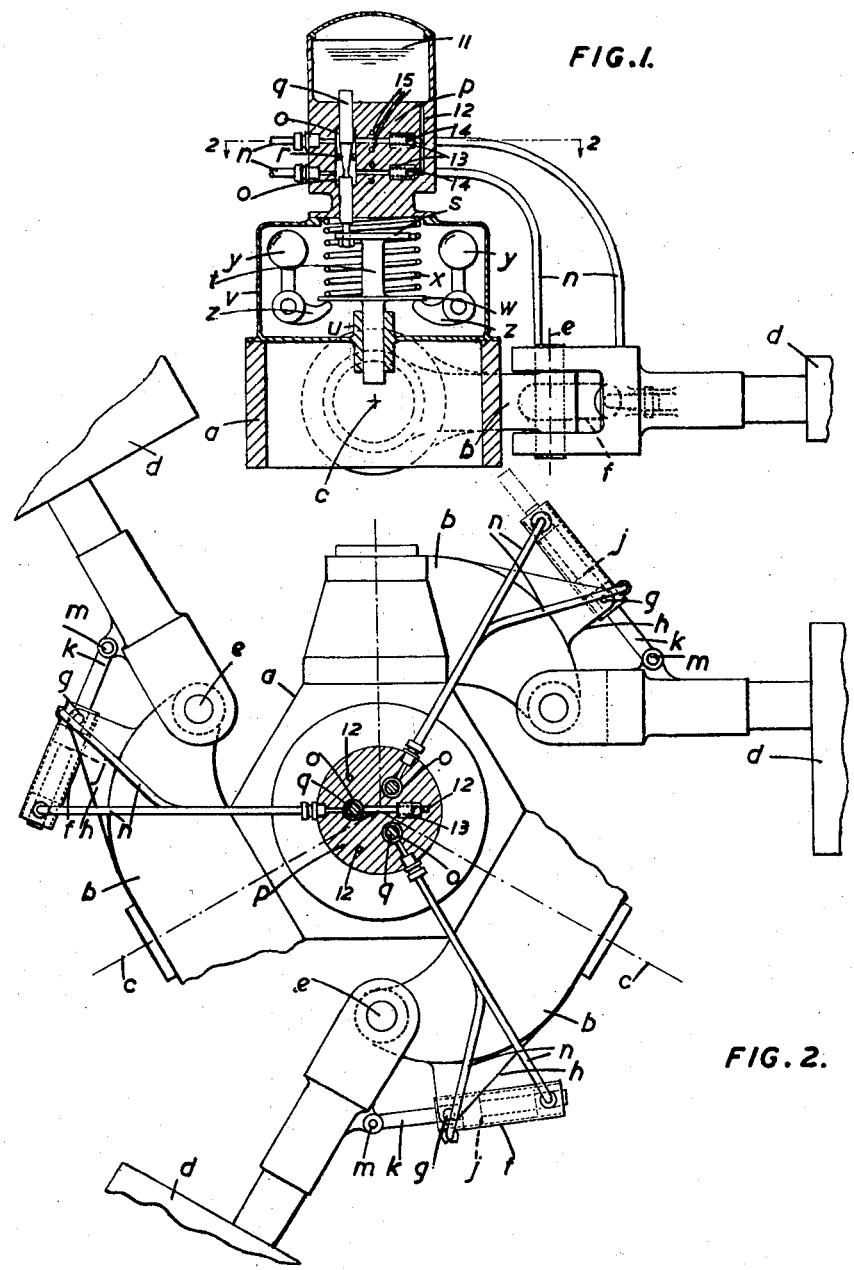
Figure 3:
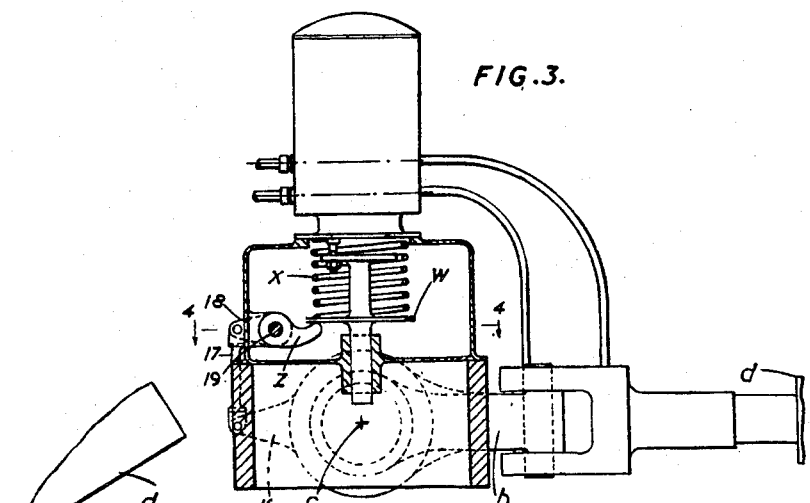
Figure 4:
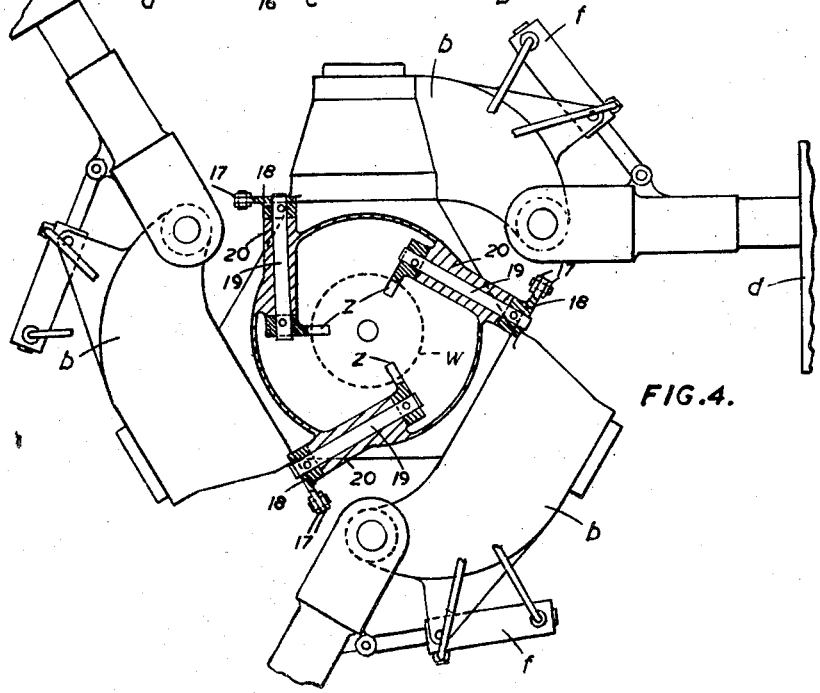

The invention is illustrated by the accompanying drawings in which Figure 1 is a sectional side elevation of one arrangement in which hydraulic dampers are used; Figure 2 is a plan, part of which is in section on the line 2—2, Figure 1; Figure 3 is a sectional side elevation of an alternative arrangement, and Figure 4 is a plan, part of which is in section on the line 4—4, Figure 3.

As illustrated in Figures 1 and 2, $a$ is a rotor head on which drag links $b$ are pivoted on flap axes $c$, and $d$ are rotor blades pivoted to the drag links $b$ on drag axes $e$. Between each blade $d$ and its drag link $b$ is disposed an hydraulic damper comprising a cylinder $f$ pivoted at $g$ between a pair of lugs such as $h$ on the drag link $b$ and a plunger $j$ on a rod $k$ pivoted at $m$ to the blade $d$, the rod $k$ being suitably guided at the opposite ends of the cylinder $f$. The spaces in the cylinder $f$ at opposite sides of the plunger $j$ are connected by pipes $n$, $n$ with chambers $o$, $o$ in a housing $p$ for a valve $q$ which has a tapered central part movable axially in relation to an apertured partition $r$ between the chambers $o$, $o$. The valves $q$ appropriate to the blades $d$ are all attached to a plate $s$ on a spindle $t$ guided axially by a bearing $u$ forming part of a housing $v$ mounted on the rotor head $a$. On the spindle $t$, and within the housing $v$, is a second plate $w$ against which abuts one end of a spring $x$ the other end of which abuts against the bottom of the valve housing $p$. Also acting on the plate $w$ are governor weights $y$ which are parts of bell crank levers pivoted in the housing $v$, the other arms $z$ of which bear against the plate $w$ in opposition to the spring $x$.

On the valve housing $p$ is a chamber 11, open to the atmosphere, and connected by passages 12 with pairs of chambers 13, 13 only one pair of which is shown in Figure 2, but similar pairs are provided at different levels in connection with the other valves $q$. In the chambers 13, 13 are arranged non-return valves 14, 14, and the chambers 13, 13 lead to the chambers $o$, $o$ of the appropriate valve $q$, as shown at 15, 15, for a purpose which will be explained later.

The chamber 11, the cylinders $f$ and their connections are charged with a fluid, such as oil, and it will be appreciated that as the valves $q$ are all attached to the plate $s$, the position of which in the axial direction is governor controlled, the effective area of the apertures between the pairs of chambers $o$, $o$, varies according to the speed of rotation of the rotor head $a$, the area increasing as the speed of rotation increases, and this variation sets up a corresponding variation in resistance to the flow of fluid to and from the cylinders $f$. Hence, while the necessary damping is effected at slow speeds, it is reduced automatically at higher speeds, e. g. in flight. Any loss of fluid due to leakage from the cylinders $f$ is compensated by additional fluid drawn in from the chamber 11 through the passage 12 and non-return valves 13, 13.

In operation, when the blades $d$ are at rest, the spring $x$ forces plate $w$ to its lowermost position which holds plunger $q$ in its lowermost positition $r$ is at a minimum and a minimum of fluid can pass through conduits $n$ from the ends of cylinders $f$. This means that oscillatory movement of blades $d$ about drag pivots $e$ is resisted to a maximum extent.

When rotation of the blades takes place, as the rotation increases and the governor weights $y$ move outwardly and arms $z$ press upwardly on plate $w$ against the resistance of spring $x$, the valve plunger $q$ is moved upwardly, increasing the area of the aperture in partition $r$, and permitting more fluid to pass through the partition. This increased communication between the ends of cylinders $f$ through conduits $n$, decreases the resistance of the damping piston and cylinder arrangements $f$, $j$, $k$ to oscillatory movements of blades $d$ about drag pivots $e$.

Similarly, when the rotational speed of the blades decreases, the spring $x$ moves the plate $w$ downwardly to move valve $q$ downwardly and increase the damping effect.

Figures 3 and 4 illustrate an alternative embodiment of the invention in which the automatic adjustment of all the dampers is controlled by the upward displacement of any one blade about its flapping pivot. In this modification the variation in resistance to the flow of fluid to and from the cylinders $f$ is effected in the same manner as hereinbefore set forth except that the spring influenced plate $w$ is not acted upon by centrifugal governor weights $y$, but each of the drag links $b$ is prolonged as at 16 beyond its flapping axis $c$ and is connected by a link 17 with an arm 18 fast on a spindle 19 carried in a bearing 20 in the wall of the housing $v$, while also fast on the spindle 19, but within the housing $v$, is an arm $z$ which bears against the underside of the plate $w$ in opposition to the spring $x$.

In operation of the embodiment of Figures 3 and 4, the only difference from the operation of the embodiment of Figs. 1 and 2 is that displacement of any one of blades $d$ in a flapping direction due to variations in their rotational speed causes transmission of more or less pressure to the underside of plate $w$ through drag link prolongations 16, links 17, arms 18, spindles 19 and arms $z$. Thus the position of valve $q$ depends on the degree of rotor blade displacement in a flapping direction, and as the rotor speed increases and the blades $d$ move upwardly, the damping is lessened, since more fluid is allowed to pass through the aperture in partition $r$. Similarly, as rotation decreases and the blades pivot downwardly about axes $c$, the damping effect is increased due to downward movement of valve $q$.

It is clear that in both embodiments of the invention, the variation of the degree of damping depends upon blade displacement, either directly from rotary displacement which sets up centrifugal force, or from upward displacement of the blades about axes $c$. It should also be clear that the rotary displacement of the blades is the cause of the upward blade displacement about axes $c$ which operates the embodiment of Figs. 3 and 4. Thus, displacement of blades $d$, and more specifically, rotary displacement of the blades, operates both embodiments.

I claim:

1. In a rotary wing aircraft having articulated rotor blades including drag hinges, means for damping movement of the blades about said drag hinges, said damping means being connected between said blades and aircraft structure with respect to which said blade moves about its drag hinge, control means connected to said damping means for varying the degree of damping, actuating means engaging said control means for operation of said control means and means operatively associated with said actuating means coordinating the movement of said actuating means with the displacement of said blades.

2. The arrangement set forth in claim 1, said last mentioned means comprising centrifugal force operated means.

3. The combination set forth in claim 1, said last mentioned means being connected to said blade and to said actuating means so that the damping effect varies in response to flapping movement of any one blade caused by blade rotation.

4. In a rotary wing aircraft having articulated rotor blades including drag hinges, means for damping movement of the blades about said drag hinges, said damping means being connected between said blades and aircraft structure with respect to which said blade moves about its drag hinge, means connected to said damping means and operable to vary the degree of damping, a damping means control element associated with said damping varying means and movable between a position in which the damping action is strongest and a position in which the damping action is weakest, resilient means urging said control element toward one of said positions, and means connected to said control element and operable by displacement of said blades for moving said control element against the action of said resilient means.

5. The combination set forth in claim 4, said last mentioned means being operable by upward flapping displacement of any one rotor blade.

6. In a rotary wing aircraft having articulated rotor blades supported by a hub and including drag hinges, means for damping movement of the blades about said drag hinges, said damping means being connected to said blades and aircraft structure with respect to which said blade moves about its drag hinge and control means for said damping means and connected thereto, said control means being carried by said hub and being operable during rotation of the blades for varying the damping action of said damping means.

7. In a rotary wing aircraft having articulated rotor blades including drag hinges, hydraulic damping means for damping movement of said blades about said drag hinges, said damping means being connected between said blades and aircraft structure with respect to which said blade moves about its drag hinge, a throttle arrangement connected to said damping means for varying the degree to which said damping means resists blade movement about said drag hinges, and centrifugal force operated means responsive to rotor rotation and connected to said throttle arrangement for varying the setting of said throttle arrangement and thereby the degree of damping.

8. In a rotary wing aircraft, the combination set forth in claim 7, said hydraulic damping means including a cylinder and piston, fluid conduits connected to said cylinder on each side of said piston, said throttle arrangement providing a connection between said conduits and regulating flow between the conduits.

9. In a rotary wing aircraft, the combination set forth in claim 8, said throttle arrangement including an aperture providing for flow between said conduits, a tapered plunger movably mounted in said aperture, and means attaching said plunger to said centrifugal force operated means.

10. In a rotary wing aircraft, the combination set forth in claim 7, a hydraulic fluid reservoir for supplying fluid to said damping means, passageway means connecting said reservoir to said damping means, and check valves located in said passageway means permitting flow of fluid only in a direction away from said reservoir.

11. In a rotary wing aircraft having articullated rotor blades including drag hinges each having two relatively movable parts, hydraulic means including cylinder and piston means connected one to each of the relatively movable parts of each hinge for damping movement of said blades about said drag hinges, said hydraulic means being connected between said blades and aircraft structure with respect to which said blade moves about its drag hinge, fluid conduits connected to said cylinder on each side of said piston, a throttle arrangement providing a connection between said conduits, and means connecting said blades to said throttle arrangement whereby flapping movement of any one blade will control said throttle arrangement.

12. The combination set forth in claim 11, said throttle arrangement including a tapered plunger, resilient means urging said plunger in one direction, and means connecting said blades to said plunger whereby the upward flapping movement of any one blade will move said plunger in opposition to said resilient means.

JAMES ALLAN JAMIESON BENNETT.

REFERENCES CITED

The following references are of record in the file of this patent:

UNITED STATES PATENTS

| Number | Name | Date |
|---|---|---|
| 1,417,786 | Walker | May 30, 1922 |
| 1,786,644 | Davis | Dec. 30, 1930 |
| 1,948,457 | Larsen | Feb. 20, 1934 |
| 1,965,224 | Ernst et al. | July 3, 1934 |
| 2,102,027 | Prewitt | Dec. 14, 1937 |
| 2,250,826 | Everts | July 29, 1941 |
| 2,465,681 | Gluhareff | Mar. 29, 1949 |